June 4, 1946.  T. G. WEIHS  2,401,442
MANUFACTURE OF TEMPERED GLASS
Filed Aug. 7, 1940  5 Sheets-Sheet 3
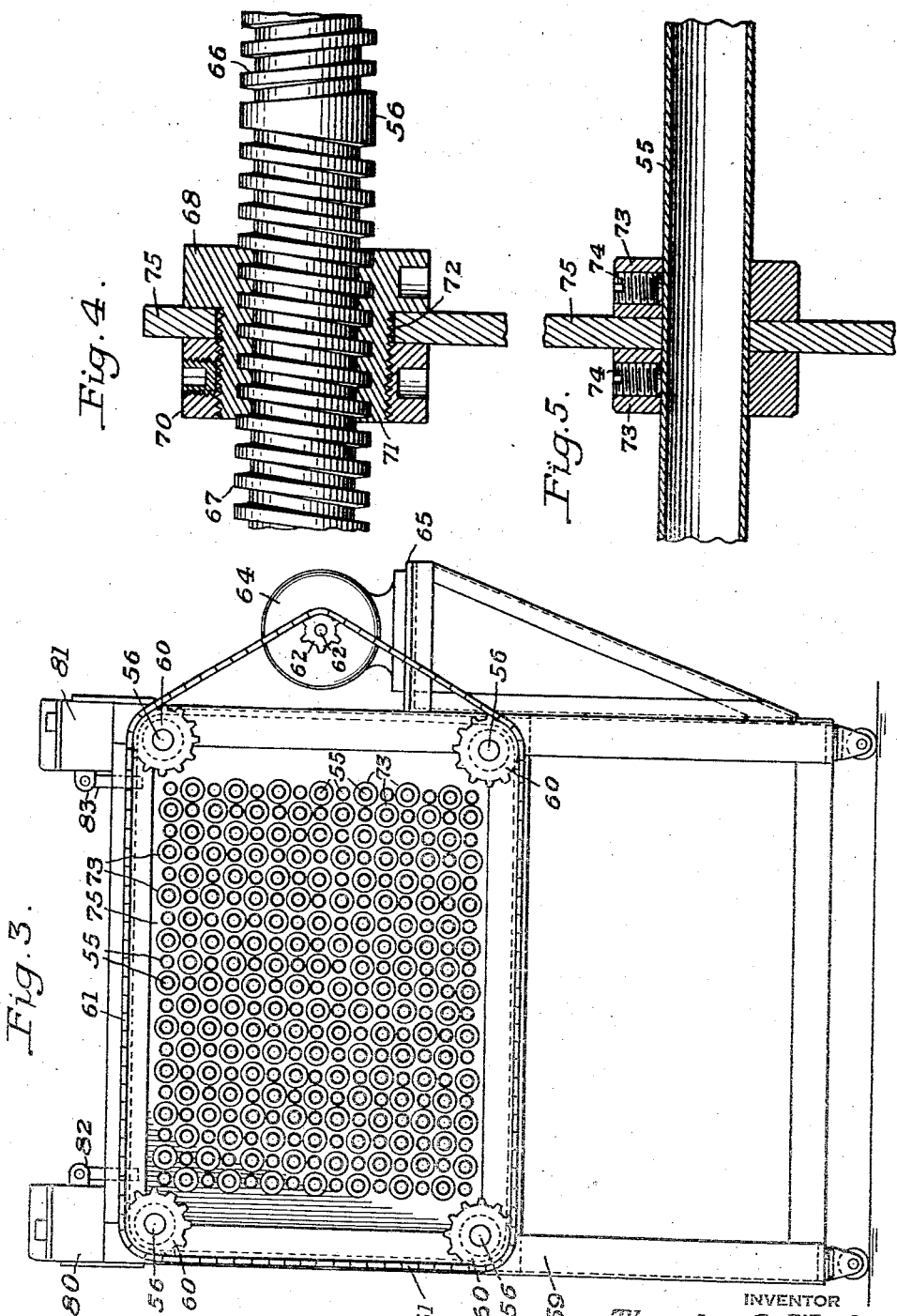
INVENTOR
Theodor G. Weihs

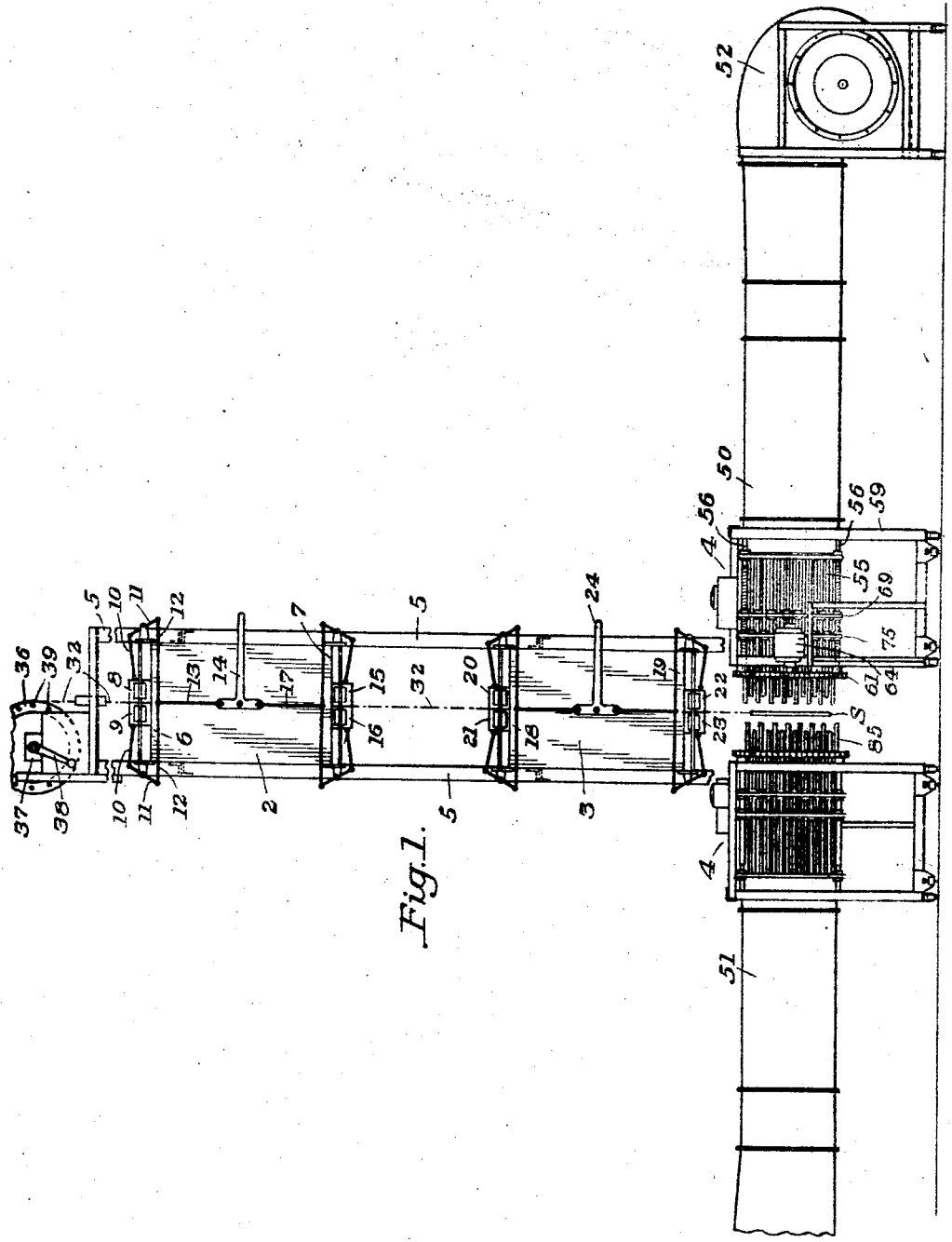

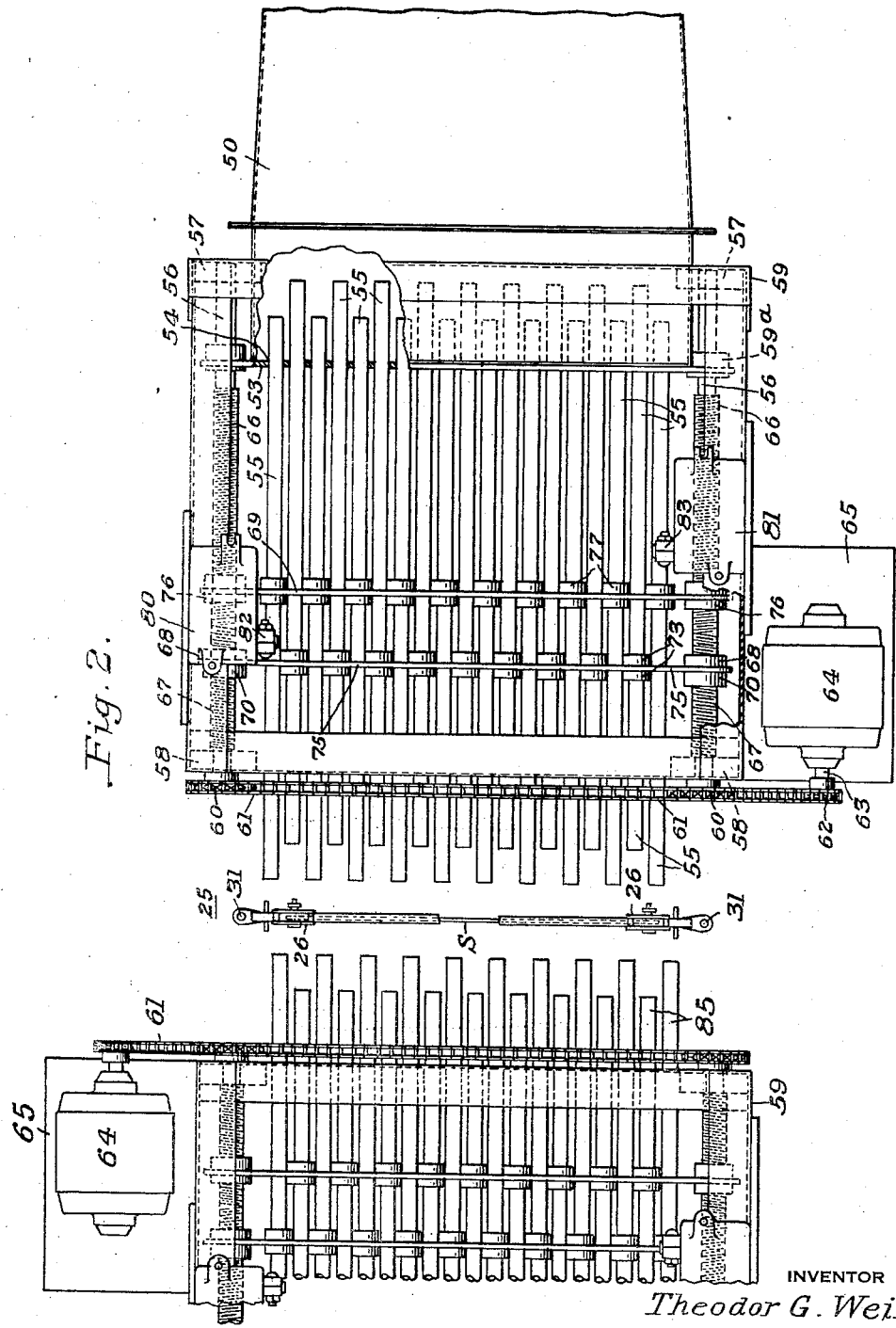

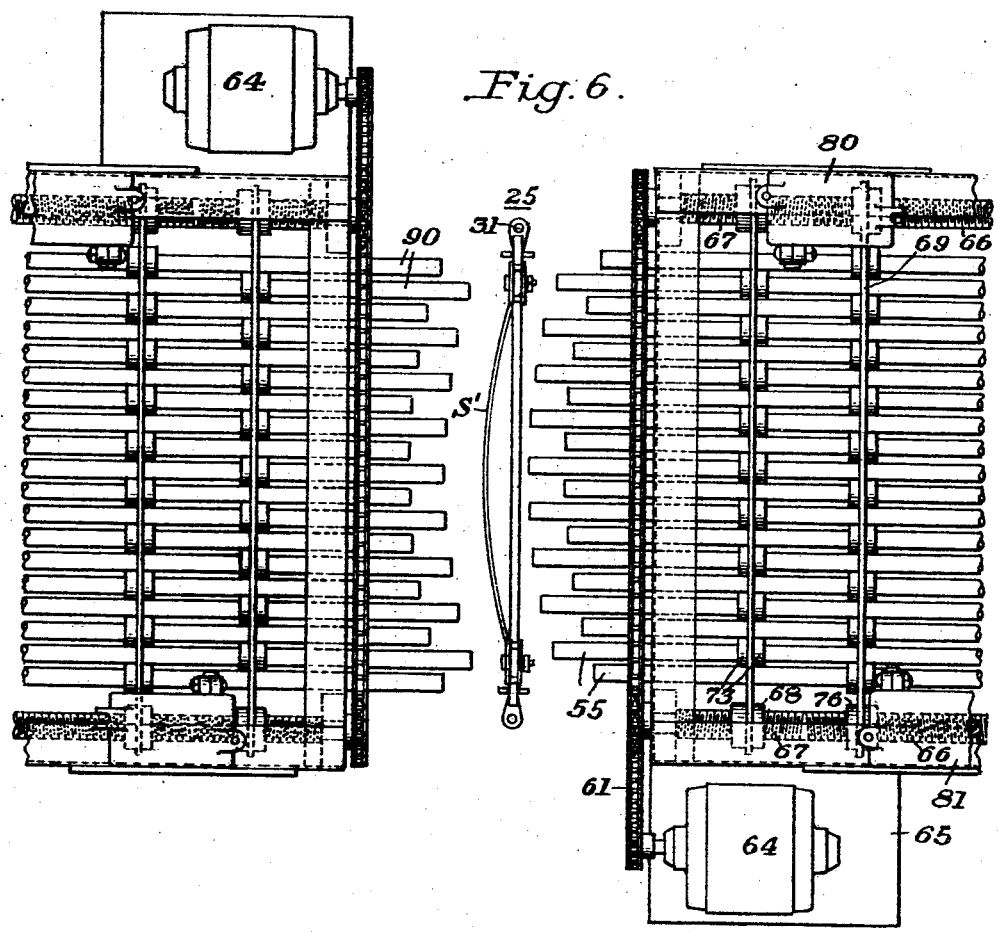

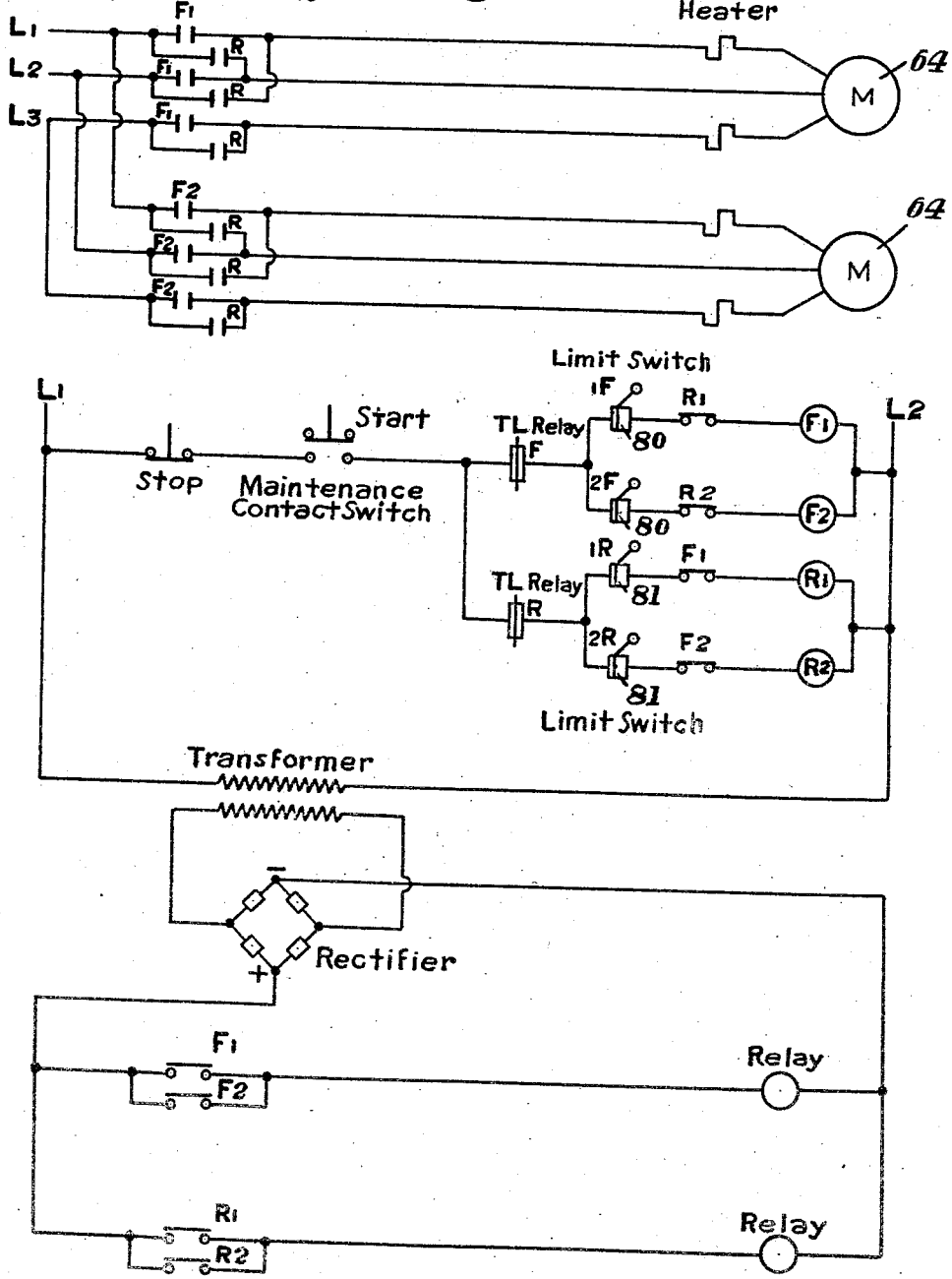

Patented June 4, 1946

2,401,442

UNITED STATES PATENT OFFICE 2,401,442

MANUFACTURE OF TEMPERED GLASS

Theodor G. Weihs, Pittsburgh, Pa., now by judicial change of name Theodore G. White, assignor to American Window Glass Company, Pittsburgh, Pa., a corporation of Pennsylvania Application August 7, 1940, Serial No. 351,757

9 Claims. (Cl. 49—89)

The present invention relates to tempered or case hardened glass and more particularly to an improved method for manufacturing such glass.

As is well known in the glass art, tempered or case hardened glass is not ordinary annealed glass but is glass which has been heated to a temperature approximating the softening point of the glass and then suddenly chilled or cooled so as to place the interior of the glass under tension and the exterior portion thereof under compression. When properly tempered in this manner the glass, when fractured, does not break into large pieces but shatters into innumerable small fragments having rounded edges so that there is little chance of any serious injury being inflicted upon a person who comes into contact with such fragments. Tempering of this character also very materially increases the mechanical strength of the glass so that it resists without fracturing very substantial impacts.

Some of the methods of tempering glass which have been used heretofore have resulted in products having great mechanical strength and which when fractured break into the desirable small pieces but considerable difficulty has been encountered in such processes due to the formation of iridescent spots in the glass. Such spots are objectionable as they can be seen by the naked eye if the glass is viewed at various angles. Such spots also are quite apparent when the sheets are examined under polarized light. Such objectionable iridescent spots are particularly apparent in glass sheets which have been manufactured by a tempering process involving the blowing of air or some other suitable gaseous medium directly against the glass sheet by means of a plurality of spaced nozzles. They are not particularly prevalent, however, where such glass is manufactured by an immersion process, that is, by a process in which the glass sheet is heated to a point just below the softening point and then immersed in a suitable chilling liquid. However, glass made by immersion processes known heretofore has not been particularly satisfactory from the standpoint of the character of the break obtained when shattered. Nor has such glass been particularly satisfactory from the standpoint of mechanical strength.

In accordance with the present invention, I provide a method for manufacturing tempered glass which results in a product having mechanical strength at least as great as or greater than that obtained by the presently known processes and which, upon fragmentation, breaks into innumerable small pieces of suitable character. In addition, the glass manufactured in accordance with my invention is relatively free of objectionable iridescent spots and it can be manufactured quickly, efficiently and economically.

In accordance with my invention the glass sheet to be tempered is heated to a temperature near the softening point of the glass and is then quickly cooled by blowing a gaseous cooling medium against both faces thereof, the gaseous cooling medium being blown against the faces of the glass sheets in a plurality of streams, and in such manner that the intensity with which each stream impinges upon a face of the glass sheet is alternately increased and decreased. In addition, as will be pointed out more fully hereinafter, in carrying out my invention, I preferably increase the intensity with which a plurality of the streams impinge upon each face of the glass sheet and at the same time decrease the intensity with which the adjacent streams impinge upon the faces of the glass sheets and alternately increase and decrease the intensity of each of these sets of streams periodically during the cooling of the sheet. After the sheet has been cooled in this manner to a sufficient extent to permit handling thereof, the glass sheet is then removed from the supporting mechanism and is ready for use or testing.

In the accompanying drawings I have shown for purposes of illustration only a preferred embodiment of apparatus which can be used in carrying out my invention and a slightly modified form of apparatus. In the drawings, Figure 1 is a side elevational view of the apparatus which may be used in carrying out my invention;

Figure 2 is a partial plan view of the cooling apparatus shown in Figure 1, some of the parts being broken away for clarity;

Figure 3 is a front elevational view of one of the cooling headers and the nozzles or pipes cooperating therewith;

Figure 4 is a sectional view through a portion of the driving mechanism for reciprocating the tubes through which the gas is blown onto the glass sheet;

Figure 5 is a partial sectional view showing a connection between one of the tubes and the driving mechanism; and Figure 6 is a view similar to Figure 2 showing a modified form of apparatus which may be used for tempering curved glass sheets.

In the embodiment shown in the drawings, the glass sheet S is first heated in the heating furnace 2 and is then transferred to and brought up to the desired temperature in the heating furnace 3. The furnaces 2 and 3 are positioned vertically above the cooling apparatus designated generally by the reference character 4 and are supported on the vertically extending frame 5. The furnace 2 is provided with a longitudinally extending slot in the top wall 6 thereof and a longitudinally extending slot in the bottom wall 7 thereof. The slot in the top wall is normally covered by doors or closures 8 and 9 which are slidable toward and away from each other in order to close or open the slot. These doors may be operated by any suitable mechanism such as by the pivoted rods 10, 11 and 12 which are rocked on their pivots by a rod 13 movable vertically by a pivotally mounted operating lever 14. The bottom slot or opening of the furnace 2 is likewise normally closed by doors 15 and 16 which are moved to open or closed position through a series of pivotally mounted rods similar to those just described with respect to the upper doors 8 and 9. These rods may be connected to the same operating handle 14 by means of a link 17 so that the two sets of doors or closures may be operated simultaneously.

The bottom furnace or heating chamber 3 is likewise provided with a longitudinally extending slot in the top wall 18 thereof and a bottom longitudinally extending slot in the bottom wall 19. The slot in the upper wall 18 is normally closed by doors 20 and 21 and the slot in the bottom wall 19 is normally closed by doors 22 and 23. By means of appropriate linkage such as that previously described in connection with the first heating chamber 2, these doors may be opened or closed simultaneously by means of a pivotally mounted operating handle 24.

The glass sheet to be tempered is mounted on a frame 25 by means of clamps indicated generally by the reference character 26. Guide rods 31 are suitably supported on the frame 5.

The frame 25 carrying the glass sheet S is moved vertically along these guide rods through the heating chambers and into appropriate position between the two headers of the cooling apparatus. The frame 25 is supported by and moved along the rods 31 by metallic straps 32. The straps 32 are of appropriate length to permit the lowering of the glass carrying frame through the two heating furnaces and into position between the cooling headers. These straps 32 extend around rotatable wheels 36 suitably mounted in bearings 37 carried by the frame 5 at the top thereof. The wheels 36 are rotated by a crank 38 in the embodiment shown in the drawings, but it will be apparent that appropriate mechanism can be provided for automatically raising and lowering the glass carrying frame. In the embodiment shown in the drawings, the wheels 36 can be stopped at any suitable point by means of pins which may be placed in holes 39 positioned around the periphery of each wheel.

After the glass sheet has been clamped in the frame 25, the frame and the glass sheet are lowered into the upper furnace. This furnace is provided with suitable electrical heating elements and the glass sheet is permitted to remain therein for a sufficient period of time to raise the temperature thereof to approximately 900°. This, under normal conditions, requires a period of approximately 2½ minutes where ⅛" sheet glass is employed. Thereafter the doors of the furnaces are opened and the frame 25 and the glass sheet S thereon are lowered into the heating furnace 3. The glass sheet is permitted to remain in this furnace for the same length of time as it was in the first furnace and the temperature thereof is raised to approximately the softening point of the glass. Where ordinary sheet glass is employed, I have found that a temperature of approximately 1350° is entirely satisfactory. Thereafter the glass sheet is removed from the furnace 3 and lowered to a position between the headers of the cooling apparatus indicated generally by the reference character 4.

The cooling mechanism consists of a header 50 located on one side of the glass sheet when it is in position to be cooled and a similar header 51 located on the opposite side. As the two headers and the mechanism cooperating therewith are identical, only one will be described herein.

The header 50 is rectangular in general configuration but may be of any suitable shape depending upon the configuration of the glass sheets to be cooled thereby. The rear end of the header 50 is connected to the blower 52 for blowing cool air through the header and against the glass sheet S. The front end of the header 50, that is, the end closest the glass sheet, is provided with a closure plate 53 having a plurality of holes 54 therein for receiving and partially supporting one end of the tubes or nozzles 55. This plate 53 is welded or otherwise suitably secured to the front end of the header 50. Adjacent each of the four corners of the header a rotatable shaft 56 is mounted in suitable bearings 57 and 58 carried by the frame 59. These shafts are also partially supported by bearings 59a carried by the plate 53. The front end of each shaft 56 extends through the bearing 58 and has keyed thereto a sprocket 60 having teeth thereon for cooperating with a chain 61 for driving the shafts. The chain 61 extends around all four sprockets and also over a sprocket 62 carried by the shaft 63 of a driving motor 64 which is mounted on a bracket 65 carried by the frame 59. The motor and chain are used for driving the shafts 56 which in turn, through the mechanism about to be described, reciprocate the tubes 55 alternately toward and away from the glass sheet to be cooled.

Each shaft 56 is provided with two threaded sections, the one section 66 being threaded in one direction and the section 67 being threaded in the reverse direction. The threaded sections 66 of the shafts 56 are utilized for reciprocating one group of the tubes or nozzles 55 and the threaded section 67 is utilized for reciprocating another group of the nozzles toward and away from the glass sheet. An internally threaded nut or block 68 is threaded on the section 67 of each shaft 56. A transversely extending plate 75 is secured to the block or nut 68 by means of a nut 70 which is threaded on a reduced end section 71 of the nut 68. The plate 75 is provided with an opening 72 which is sufficiently large to permit the plate to be placed in position over the reduced and threaded end section 71 of nut 68. The plate 75 is also provided with a plurality of holes for receiving the nozzles or tubes 55. These nozzles or tubes extend through the openings in the plate 75 and some of them are appropriately secured to the plate 75 so that as the plate is moved rearwardly and forwardly by the nuts 68 and the shafts 56 these tubes will be alternately moved toward and away from the glass sheet. Alternate tubes in each horizontal row are secured to the plate 75 by collars 73 positioned on either side thereof. These collars 73 are secured in appropriate position on the tubes 55 against the plate 75 by set screws 74. A plate 69 similar to the plate 75 is provided for cooperation with the tubes which are not connected to the plate 75. Nuts 76 which are internally threaded for cooperation with the threaded sections 66 of the shafts 56 are provided for moving the plate 69. The plate 69 is secured to these nuts 76 in the same manner as the plate 75 is secured to the nuts 68. The plate 69 has a plurality of holes extending therethrough for receiving the nozzles or tubes 55. The tubes 55 which are not secured to the plate 75 are secured to and movable with the plate 69 by means of collars 77 which are secured to the tubes in the same manner as the collars 73 are secured to the tubes.

It will be apparent from the above description of the tubes and the driving mechanism that when the shafts 56 are rotated in one direction by the motor 64 the nuts 76, the plate 69, and the tubes rigidly connected thereto will be moved in one direction and the nuts 68, the plate 75, and the tubes 55 rigidly connected thereto will be moved in the reverse direction due to the fact that the nuts 68 and 76 are on oppositely threaded sections of the shafts 56. It will also be apparent that when the motor 64 is reversed the direction of rotation of the shafts 56 is reversed and the plates 69 and 75 and the tubes connected thereto are moved in the opposite directions.

In order to control the extent of the movement of the tubes in any particular direction limit switches 80 and 81 are appropriately positioned on the frame 59. The limit switch 80 is provided with an arm 82 which is arranged to be moved by the plate 75 when it has been moved to its rear position. The limit switch 81 is provided with a similar arm 83 which cooperates with the plate 69 when it is moved to its rear position. In Figure 2 the plate 69 and the tubes cooperating therewith are shown in advanced position and the plate 75 and the tubes connected thereto are shown in retracted position.

Appropriate electrical mechanism is provided for reversing the motors 64 at the desired time. The particular electrical mechanism employed for reversing the motors 64 forms no part of the present invention and consequently will not be described in detail. Electrical circuits for automatically reversing motors such as the motors 64 are conventional. Such circuits, including appropriate limit switches, are illustrated in Figures 9, 12 and 13 and described in the specification of United States Letters Patent No. 1,921,479, issued on August 8, 1933. It will suffice to state that when the plate 75 comes in contact with the arm 82 of the limit switch 80 the supply of current to the motor 64 is interrupted and the tubes will remain in the position shown in Figure 2 for a short period of time, whereupon the motor 64 is re-energized for rotation in the reverse direction. The plate 75 is then moved forwardly and the plate 69 rearwardly. When the plate 69 comes in contact with the arm 83 of the limit switch 81 the current supply to the motor 64 is interrupted and movement of the tubes ceases until the motor 64 is again energized for rotation in the reverse direction. This reversal of the motor and the time interval between its rotation in one direction and its rotation in the other direction can be appropriately controlled and regulated by relays and other electrical mechanism well known in the art.

As stated above, the header 51 and the co-operating mechanism are similar to the header 50 and its cooperating mechanism. The tubes 85 which cooperate with the header 51 are reciprocated forwardly and rearwardly in the same manner as the tubes 55. These tubes 85 however, are not positioned directly opposite the tubes 55. They are positioned so that the air discharged therefrom, particularly when in the advanced position, strikes areas between the various nozzles or tubes 55 on the other side of the glass sheet. I have found that it is undesirable to have the tubes on opposite sides of the glass sheet arranged symmetrically and consequently preferably arrange mine in the manner stated above and shown in the drawings.

The apparatus described above is primarily for tempering flat glass sheets. However, it can be used for tempering curved sheets of glass of any desired curvature by modifying it slightly. In Figure 6 I have illustrated the structure when modified in such a way as to render it suitable for tempering curved glass sheets. As shown in Figure 6, the tubes or nozzles 90 are arranged so that the ends thereof adjacent the glass sheet S' are in curved planes, parallel to the curved plane of the sheet S'. In order to arrange the tubes or nozzles 90 in this manner it is merely necessary to slide them forwardly or rearwardly through the collars and the holes in the closure plate for the forward end of the header. In order to do this it is merely necessary to loosen the set screws which fasten the collars to the tubes. When arranged in this manner each nozzle or tube in each group or set on each side of the glass sheet is positioned exactly the same distance away from the curved glass sheet being tempered as each other tube in the same set or group.

In this embodiment of the invention, the tubes are reciprocated in the same manner as the tubes of the embodiment illustrated in Figures 1 to 5 inclusive, and consequently the apparatus employed for effecting the reciprocation of the tubes in this embodiment will not be specifically described herein.

In the operation of the structures disclosed in the drawings the glass sheet to be tempered is first heated to approximately 900° F. in the initial heating furnace. It is then moved to the second heating furnace where it is heated to a temperature approximately 1350°. Each of these heating operations requires approximately 2½ minutes where $\frac{1}{8}$" sheet glass is used. It will be apparent that where glass of other thicknesses is used, the heating time may be increased or decreased. For example, where ¼" plate glass is used I have found that the heating time is preferably about 2 minutes and 40 seconds. After the heating of the glass sheet has been completed it is positioned between the two headers and the cooling operation carried out by means of the apparatus described above.

I have found that any suitable number of tubes or nozzles may be utilized on each side of the glass sheet. In the embodiment shown in the drawings there are 285 tubes on each side of the glass sheet and these tubes are $\frac{1}{8}$ inch in diameter and spaced apart $1\frac{3}{16}$" from center to center. I have found that this spacing of the nozzles gives best results.

In the embodiment shown in the drawings, the tubes adjacent each face of the glass sheet are divided into two sets. One set of tubes on each side is retracted from the advanced position to the rear position as the other set is being advanced from the rear position to the advanced position. It will be apparent however, that under some circumstances it may be desirable to divide the tubes into more than two sets. I find, however, that best results can be obtained where the tubes are arranged in the manner shown in the embodiments illustrated in the drawings and where alternate tubes in each horizontal and vertical line are reciprocated together. By this arrangement when any particular tube is in advanced position the tubes adjacent thereto are in retracted position. This arrangement is advantageous as it assists in the escape of the gas from the space adjacent the glass sheet and unless provision is made for getting rid of the gases in some manner or other, difficulty is encountered in obtaining proper cooling and proper breaking characteristics in the finished product.

The position of the tubes with respect to the glass sheet is of considerable importance. I find that best results can be obtained when the tubes are so positioned that in their advanced position the ends thereof will be approximately 1" from the glass sheet. The stroke of each tube also is important. I find that a stroke of approximately 1⅝" gives best results in apparatus such as that described above.

The air pressure employed is also of considerable importance. In the apparatus described above, I find that an air pressure of approximately 6.6" of water measured at the outlet end of each tube gives best results.

In the operation of this apparatus I have found that an increase in the air pressure reduces iridescence. This is directly contrary to the results achieved where stationary nozzles are employed. Where stationary nozzles are employed and the air pressure is increased, iridescence is materially increased. I believe that this unusual phenomenon is caused by the fact that when the air pressure is reduced the streams of gas coming from the tubes which are in retracted position have very little effect upon the glass and upon the air coming from the advanced tubes and that consequently there is not a proper distribution of the air throughout the area of the glass sheet.

Another unusual phenomenon which I have experienced with the apparatus and method which I provide is that when the nozzles or tubes are arranged so as to increase the distance between the glass sheet and the nozzles when in advanced position iridescence is increased. This is directly contrary to what happens where stationary nozzles are used. Where stationary nozzles are employed a decrease in the distance between the glass and the nozzles increases iridescence and an increase in the distance reduces it.

I have found that the rate of reciprocation of the various nozzles can be varied over a wide range. In the apparatus disclosed in the drawings and described above, I prefer to reciprocate the nozzles approximately 20 to 30 times per minute although this rate of reciprocation can be very greatly increased or decreased to suit the operating conditions encountered.

While I preferably employ a gas such as air in the carrying out of my invention, it will be obvious that any other fluid capable of being forced through the tubes under pressure may be used. For example, other gases or vaporized liquids may be employed.

While I have shown and described a preferred method of practicing my invention I do not intend to be limited thereto as my invention may be otherwise practiced within the scope of the appended claims.

I claim:

1. In a process of manufacturing tempered glass in which a glass sheet is first heated to a temperature approximating the softening point and then chilled, the steps comprising chilling the sheet by a plurality of spaced, continuous streams of a cooling fluid caused to impinge upon each face of the sheet and, at the same time, alternately and inversely increasing and decreasing the intensity with which adjacent fluid streams on the same side of the sheet impinge upon the sheet while maintaining the angle of incidence between the center line of each stream and the glass sheet substantially constant.

2. In a process of manufacturing tempered glass in which a glass sheet is first heated to a temperature approximating the softening point and then chilled, the steps comprising causing a plurality of streams of a cooling fluid to impinge upon each face of the sheet and, at the same time, increasing the intensity with which some of the streams impinge upon the sheet while decreasing the intensity with which other adjacent streams impinge upon the sheet, the angle of incidence between the center line of each stream and the glass sheet remaining substantially constant.

3. In a process of manufacturing tempered glass in which a glass sheet is first heated to a temperature approximating the softening point and then quickly chilled, the steps comprising causing one set of a plurality of spaced, continuous streams of cooling fluid to impinge upon each face of the glass sheet, at the same time causing another set of a plurality of streams of cooling fluid to impinge upon each face of the glass sheet, and inversely varying the intensity with which the sets of streams on each side of the glass sheet impinge upon the sheet while maintaining the angle of incidence between the center line of each stream and the glass sheet substantially constant.

4. In a process of manufacturing tempered glass in which a glass sheet is first heated to a temperature approximating the softening point and then quickly chilled, the steps comprising causing one set of a plurality of spaced, continuous streams of cooling fluid to impinge upon at least one face of the glass sheet, at the same time causing another set of a plurality of streams of cooling fluid to impinge upon the same face of the sheet and inversely and alternately increasing and decreasing the intensity with which the streams in the respective sets impinge upon the sheet while maintaining the angle of incidence between the center line of each stream and the glass sheet substantially constant.

5. In a method of manufacturing tempered glass in which a glass sheet is heated substantially to its softening point and then chilled, the step of chilling the sheet by blowing a cooling fluid in a plurality of spaced, continuous streams against at least one face of the sheet while alternately increasing and decreasing the intensity with which the fluid streams impinge upon the sheet and while maintaining the angle of incidence between the center line of each stream and the glass sheet substantially constant.

6. In a method of manufacturing tempered glass in which a glass sheet is heated substantially to its softening point and then quickly chilled, the steps of chilling the sheet by blowing a cooling fluid in a plurality of spaced, continuous streams against at least one face of the sheet, and varying the intensity with which the fluid streams impinge upon the sheet while maintaining the angle of incidence between the center line of each stream and the glass sheet substantially constant, some of said streams impinging upon the sheet with maximum intensity while the adjacent streams impinge upon the sheet with minimum intensity.

7. In a method of manufacturing tempered glass in which a glass sheet is first heated substantially to its softening point and then rapidly chilled, the step of chilling the sheet, while maintaining the angle of incidence between the center line of each stream and the glass sheet substantially constant, by blowing a cooling fluid in a plurality of spaced, continuous streams against at least one face of the sheet so that a plurality of streams impinge upon the sheet with maximum intensity while the streams adjacent each of the ones just mentioned impinge upon the sheet with appreciably lesser intensity.

8. In a method of manufacturing tempered glass in which a glass sheet is heated substantially to its softening point and then rapidly chilled, the steps of chilling the sheet by causing a plurality of spaced, continuous streams of cooling gas to impinge upon both faces of the sheet, and, while maintaining the angle of incidence between the center line of each stream and the glass sheet substantially constant, alternately increasing and decreasing the intensity with which adjacent streams impinge upon the sheet so that while some of said streams are impinging upon the sheet with maximum intensity the streams adjacent thereto impinge upon the sheet with an intensity appreciably less than the maximum.

9. In a method of manufacturing tempered glass in which a glass sheet is heated substantially to its softening point and then chilled, the steps of chilling the sheet by blowing a plurality of spaced, continuous streams of gas against each face thereof and, while maintaining the angle of incidence between the center line of each stream and the glass sheet substantially constant, inversely varying the intensity with which adjacent streams of gas on the same side of the sheet impinge upon the sheet, the streams on one side of the sheet impinging upon areas between those on which the streams impinge on the opposite side of the sheet.

THEODOR G. WEIHS.